United States Patent
Hog

[19]

[11] Patent Number: 5,847,654
[45] Date of Patent: Dec. 8, 1998

[54] DEVICE FOR OPERATING A WINDSHIELD WIPER

[75] Inventor: Norbert Hog, Buehl, Germany

[73] Assignee: Robert Bosch GmbH, Stuttgart, Germany

[21] Appl. No.: 795,312

[22] Filed: Feb. 3, 1997

[30] Foreign Application Priority Data

Feb. 1, 1996 [DE] Germany ................ 196 03 553.8

[51] Int. Cl.⁶ .................................. G08B 21/00
[52] U.S. Cl. .............. 340/604; 340/602; 318/444; 318/483; 318/DIG. 2; 15/250.001
[58] Field of Search ..................... 340/602, 604; 318/444, 483, DIG. 2; 307/10.1; 15/250.001, 250.17

[56] References Cited

U.S. PATENT DOCUMENTS

| 4,613,802 | 9/1986 | Kraus et al. ............ 318/DIG. 2 |
| 4,710,878 | 12/1987 | Iyoda .................... 318/DIG. 2 |
| 4,740,735 | 4/1988 | Hayashi ................ 15/250.17 X |
| 4,859,867 | 8/1989 | Larson et al. ........... 318/DIG. 2 |
| 5,059,877 | 10/1991 | Teder ........................ 318/444 |
| 5,581,240 | 12/1996 | Egger ........................ 340/602 |

FOREIGN PATENT DOCUMENTS

| 0460180 | 12/1991 | European Pat. Off. . |
| 3314770 | 10/1984 | Germany . |
| 3340455 | 5/1985 | Germany . |
| 2208433 | 3/1989 | United Kingdom . |
| 91/09756 | 7/1991 | WIPO . |
| WO 91/09756 | 7/1991 | WIPO . |
| WO 94/27262 | 11/1994 | WIPO . |

OTHER PUBLICATIONS

Patent Abstracts of Japan, vol. 009, No. 025 (M–355), Feb. 2, 1985 and JP 59 171738 A (Nissan Jidosha KK), 28 Sep. 1984.
Patent Abstracts Oof Japan, vol. 017, No. 414 (M–1456), Apr. 3, 1993 and JJP 05 085310 A (Fujitsu Ten Ltd), Apr. 5, 1993.

*Primary Examiner*—Jeffery A. Hofsass
*Assistant Examiner*—Anh La
*Attorney, Agent, or Firm*—Venable; George H. Spencer; Norman N. Kunitz

[57] ABSTRACT

An apparatus for operating a windshield wiper having an automatic wiper control. The apparatus is provided with a rain sensor having a light-emitting transmitter and a receiver that responds to the emitted light by emitting a sensor signal, and an evaluation device for the sensor signal. The evaluation device has a microcomputer and a capacitor that is outside of the microcomputer and to which the sensor signal is supplied. Also included is a comparator connected to the capacitor for comparing the voltage built up at the capacitor by the sensor signal to a threshold voltage and for emitting an output signal if the threshold voltage is exceeded. The microcomputer forms a measured value from the output signal, the value of which correspond to a time at which the threshold is exceeded.

11 Claims, 1 Drawing Sheet

DEVICE FOR OPERATING A WINDSHIELD WIPER

CROSS-REFERENCE TO RELATED APPLICATION

This application claims the priority of Patent Application Serial No. P 196 03 553.8-22 filed in the Federal Republic of Germany on Feb. 1, 1996, the subject matter of which is incorporated herein by reference.

BACKGROUND OF THE INVENTION

The present invention relates to an apparatus for operating a windshield wiper that has an automatic wiper control comprising a rain sensor having a light-emitting transmitter and a receiver that responds to the emitted light by emitting a sensor signal, and an evaluation device for the sensor signal, which device includes a microcomputer.

An apparatus of this type is shown, for example, in DE 33 14 770 A1, where a useable signal is formed from the light originating from a light-emitting transmitter as follows. The light is conducted to a photoelectric receiver, with different occurrences of wetness of the windshield having characteristic effects on the light traveling to the receiver. Disturbances such as external light influences can be superimposed over the useable light, which can cause erroneous behavior of the automatic wiper control. To minimize this type of interfering external light influence, DE 33 14 770 A1 proposes to clock the emission of light by the sensor to suppress disturbing influences. The evaluation requires a relatively high outlay for the wiper control.

An apparatus for operating a windshield wiper with which disturbances in the form of external light influences can be detected and eliminated as is shown in EP 0 460 180, where sample-hold members are used and differences are formed in the evaluation device from the signals corresponding to the detected light.

Most of the known automatic wiper controls of the above type employ microcomputers having an integrated analog/digital converter. These microcomputers are relatively expensive.

SUMMARY OF THE INVENTION

It is an object of the invention to provide an apparatus of the type mentioned above which assures reliable control of wiping operation with a low outlay, eliminating disturbances, for example external light influences.

This object is accomplished with an apparatus in which the evaluation device has at least one capacitor that is provided outside of the microcomputer, and to which the sensor signal is supplied, a comparator is connected to the capacitor, with the comparator comparing the voltage built up at the capacitor by the sensor signal to a threshold voltage and emitting an output signal if the threshold voltage is exceeded, and the microcomputer forms a measured value from the output signal, which value correspond to a time at which the threshold is exceeded.

This process does not require an expensive microcomputer with an integrated A/D converter; the unequivocal output signal of the comparator can be evaluated directly. An inexpensive capacitor is used because the tolerances of the capacitor value are of no consequence, since external light and useful light can be detected to the same extent and separated from one another. The integral evaluation method also evens out disturbances (EMV) The signal resolution of the microcomputer is increased in comparison to evaluation with A/D converters, and signal evaluation thus becomes more sensitive. Signal amplification by an operational amplifier having errors is omitted.

The detection of the times up to the exceeding of the threshold is assured with the useable light alone and when useable light is accompanied by external light, because a connection of the capacitor that leads to the receiver is connected to a first control element disposed inside or outside of the microcomputer, and the capacitor can be discharged by the actuation of the first control element after the threshold voltage has been exceeded, and recharged after discharge. A simple design and reliable function result from the actuation of the transmitter to emit light synchronously with a charging or recharging process of the capacitor, and to interrupt the light emission, via a further control element disposed inside or outside of the microcomputer, synchronously with a subsequent recharging process. The first and further control elements may be configured as switching transistors.

If different threshold voltages can be predetermined by means of the microcomputer, the times to be measured can be defined into suitable time frames if, for example, drastically different light influences are to be taken into consideration. The threshold voltages can be predetermined with an internal or external voltage divider in that the microcomputer selects the suitable voltage divider.

The useable light component is reliably detected with simple measures, for example, the reciprocal values of the measured time can be formed in the microcomputer and the respective measured values can be generated from these values, and the component of useful light originating from the sensor can be distinguished from additionally received external light.

BRIEF DESCRIPTION OF THE DRAWINGS

These and other features and advantages of the invention will be further understood from the following detailed description of the preferred embodiment, with reference to the accompanying drawings, in which.

DETAILED DESCRIPTION OF THE PREFERRED EMBODIMENT

Figure 1:
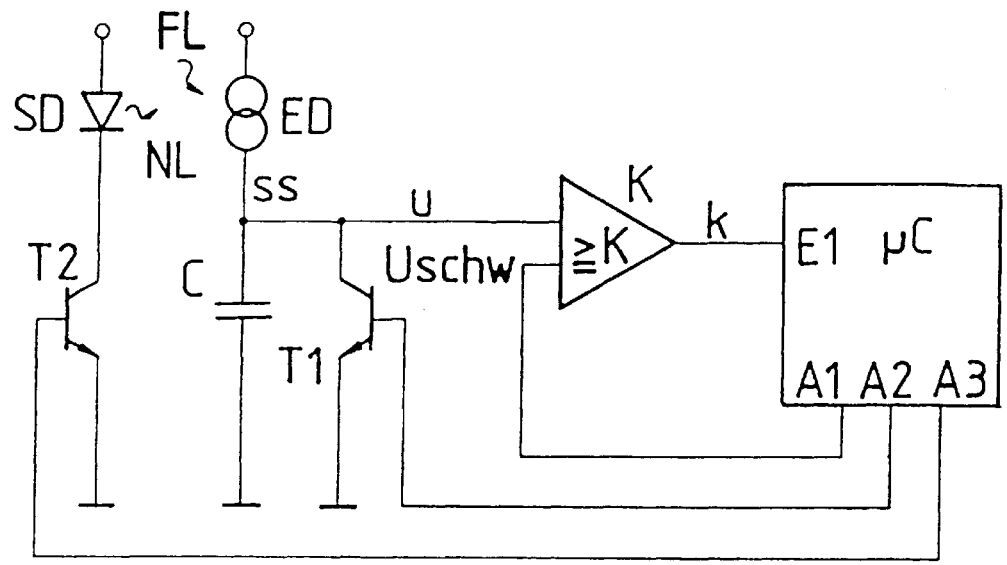
FIG. 1 shows a schematic circuit diagram of the essential parts of the automatic wiper control.

FIG. 1 shows a transmitter in the form of a transmitting diode SD, which emits light that travels, as a specific component, to a receiver in the form of a receiver diode ED via an optical path in which a segment of a windshield is contained. The receiver diode ED is connected by one of its connections to a supply-voltage potential, and the other connection is connected to ground by way of a capacitor C. An input of a comparator K, whose output is connected to an input E1 of a microcomputer $\mu$C, is connected between the receiver diode ED and the capacitor C. The other input of the comparator K is present at a first output A1 of the microcomputer $\mu$C. A control element in the form of a switching transistor T1 is connected by its collector between the receiver diode ED and the capacitor K; the emitter of this transistor T1 is grounded. The base of the switching transistor T1 is connected to a second output A2 of the microcomputer $\mu$C. The anode of the transmitter diode SD is connected to a supply-voltage potential, and the diode is connected by its cathode to the collector of a second control element in the form of a controllable, regulated current sink or a second switching transistor T2, whose emitter is grounded. The base of the second switching transistor T2 is connected to a third output A3 of the microcomputer $\mu$C.

The receiver diode ED emits a sensor signal ss that is influenced by an occurrence of wetness: for example, the impact of drops on the windshield in the light path between the transmitting diode SD and the receiver diode ED causes light to be coupled out of the windshield, correspondingly weakening the sensor signal ss. External light FL, which is coupled into the windshield, for example at a diagonal light incidence, is superimposed over the useful light component received by the receiver diode ED, and can be modulated as a consequence of the frequent light change, for example when the vehicle is driving down the street. Consequently, considerable deteriorations of the sensor signal ss can result, which can erroneously trigger the automatic wiper control. To assure reliable evaluation of the useable light NL, the sensor signal ss is integrated with the capacitor C, so that a voltage u builds up that is applied to the comparator K. If the voltage u exceeds a threshold voltage $U_{schw}$ present at the other input of the comparator K, the comparator K transmits a corresponding signal to the microcomputer $\mu$C. The microcomputer $\mu$C transmits a control signal to the switching transistor T1 by way of the second output A2, which is then driven so that the capacitor C is discharged. The current path via the switching transistor T1 is interrupted again by a corresponding control signal of the microcomputer $\mu$C, so the capacitor C is recharged. When the capacitor C is recharged, the transmitting diode SD is switched off by the transmission of a further control signal from the microcomputer $\mu$C to the second switching transistor T2, so that the current is interrupted by the transmitting diode. In this phase the receiver diode ED only receives external light FL, so the capacitor C is only charged by the current $I_{FL}$ attributed to the external light FL, and the time up to the exceeding of the threshold voltage $U_{schw}$ is only a function of the external light FL.

Figure 2:
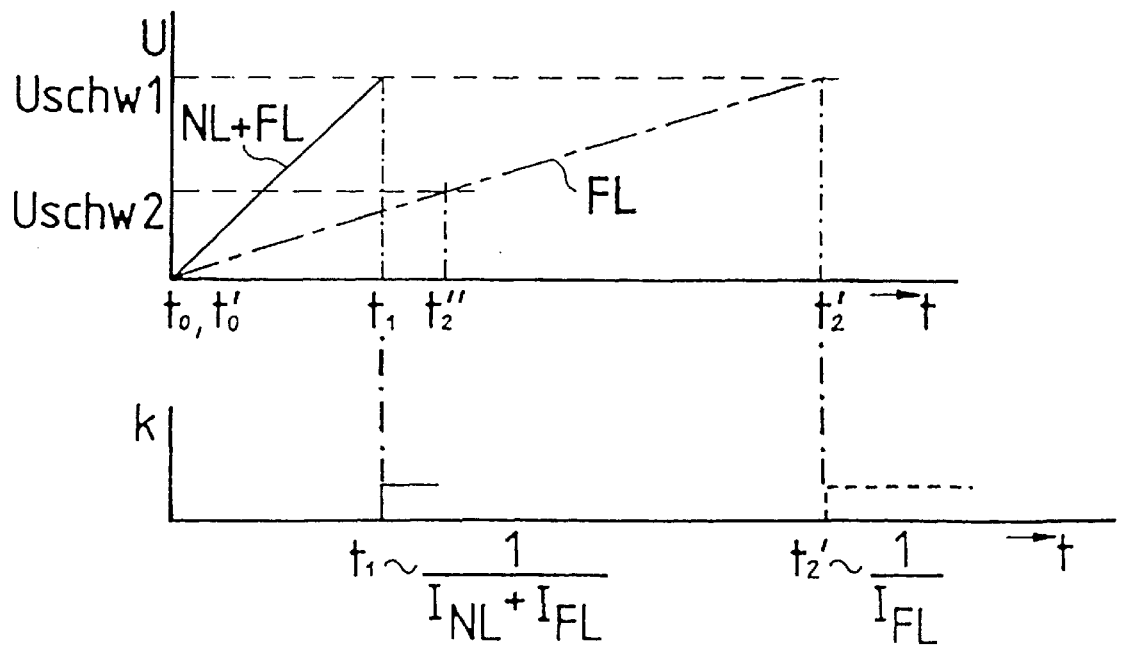
FIG. 2 shows diagrams for explaining the signal evaluation.

FIG. 2 shows two charging processes of the capacitor C over time t, and the associated output signal k of the comparator K. At a time $t_0$, a charging process of the capacitor C is started by means of the microcomputer $\mu$C, during which both useful light NL and external light FL are incident on the receiver diode ED. At a time $t_1$, the voltage u that has built up at the capacitor C exceeds the threshold voltage $U_{schw1}$. Afterward, the transmitting diode SD is switched off, and a new capacitor-charging process is begun at a time $t_0'$. At this time the transmitting diode SD is switched off, so only external light FL strikes the receiver diode ED. Consequently, the capacitor C is charged more slowly, and the voltage u does not exceed the threshold voltage $U_{schw1}$ until a time $t_2'$. As is apparent from the lower diagram in FIG. 2, the comparator C transmits a corresponding output signal k to the microcomputer $\mu$C at this time. The charge cycle time up to the point at which the threshold is reached is inversely proportional to the respective current flux with which the capacitor C is charged, that is, on the one hand, inversely proportional to the sum of the current caused by the component of useful light NL and the current caused by the external light FL and, on the other hand, inversely proportional to the current caused by the external light FL alone.

As is apparent from the upper diagram in FIG. 2, the microcomputer $\mu$C can be used to set a different threshold $U_{schw2}$ for the charging process by the external light FL alone to shorten the charge cycle, particularly with a small quantity of external light FL, so the threshold voltage $U_{schw2}$ is exceeded, for example, at time $t_2''$.

The reciprocal value is formed from the measured times in the microcomputer $\mu$C and, if need be, an estimate is performed with suitable constants. The formation of the difference between the reciprocal values of the times, with and without useful light, completely eliminates the influence of the external light FL, so the signal that is obtained is dependent solely on the useable light NL, and this results in a reliable evaluation for determining the state of wetness and the operation of the automatic wiper control. The threshold voltages $U_{schw1}$, $U_{schw2}$, which may differ, are taken into consideration in the elimination of the external light influence.

The switching transistors T1, T2 of the comparator K, and/or the voltage dividers for setting the different threshold voltages $U_{schw1}$, $U_{schw2}$, as well as further structural elements, can be integrated into the microcomputer $\mu$C, so only one external capacitor C is required as an additional component for the construction of the circuit. Different threshold voltages can also be formed by different capacitors.

Thanks to the above arrangement, external light influences are reliably eliminated.

It will be understood that the above description of the present invention is susceptible to various modifications, changes and adaptations, and the same are intended to be comprehended within the meaning and range of equivalents of the appended claims.

What is claimed is:

1. In an apparatus for operating a windshield wiper having an automatic wiper control comprising a rain sensor having a light-emitting transmitter, a receiver that responds to emitted light by emitting a sensor signal, and an evaluation device for the sensor signal, said evaluation device including a microcomputer, at least one capacitor outside of said microcomputer, and to which the sensor signal is supplied to charge the capacitor, and control circuit means, controlled by the microcomputer, for enabling charging of said capacitor by the sensor signal at a desired point in time, a comparator connected to said capacitor for comparing the voltage built up at said capacitor over time by the sensor signal to a threshold voltage and for emitting an output signal, corresponding to the integral over time of the applied sensor signal, if the threshold voltage is exceeded, said microcomputer forming a measured value from the output signal, the value of which corresponds to a period of time for the built up voltage to exceed the threshold voltage.

2. The apparatus as defined in claim 1, wherein the evaluation device comprise an external-light-recognition device.

3. The apparatus as defined in claim 1, wherein said control means includes a first control element connected to a connection of said capacitor that leads to the receiver with said capacitor being dischargeable by the actuation of said first control element after the threshold voltage has been exceeded and rechargeable following discharge.

4. The apparatus as defined in claim 3, wherein said transmitter is actuated by way of a further control element, controlled by the microcomputer, to emit light synchronously with charging of said capacitors, and to interrupt the light emission synchronously with a subsequent recharging process.

5. The apparatus as defined in claim 4, wherein said first and further control elements are switching transistors.

6. The apparatus as defined in claim 1, wherein said microcomputer predetermines different threshold voltages.

7. The apparatus as defined in claim 6, wherein said threshold voltages are predetermined with an internal voltage divider.

8. The apparatus as defined in claim 6, wherein said threshold voltages are predetermined with an external voltage divider.

9. The apparatus as defined in claim 1, wherein reciprocal values of measured time periods are generated in the microcomputer, and respective measured values are generated from these reciprocal values, with the component of useable light originating from the transmitter being distinguishable from additionally received external light.

10. The apparatus as defined in claim 4, wherein said further control element is a controllable, regulated current sink.

11. The apparatus as defined in claim 1, wherein said transmitter is actuated by a control element, controlled by the microcomputer, to emit light synchronously with charging of said capacitor, and to interrupt the light emission synchronously with an immediately subsequent recharging process.

* * * * *